United States Patent [19]
Stockton

[11] 3,730,021
[45] May 1, 1973

[54] INLINE TRANSMISSION FOR HIGH SPEED ENGINES

[75] Inventor: Thomas R. Stockton, Ann Arbor, Mich.

[73] Assignee: Ford Motor Company, Dearborn, Mich.

[22] Filed: Dec. 3, 1971

[21] Appl. No.: 204,526

[52] U.S. Cl. ................................................74/759
[51] Int. Cl. ............................................F16h 57/10
[58] Field of Search .....................74/758, 759, 760, 74/761

[56] References Cited

UNITED STATES PATENTS

| | | | |
|---|---|---|---|
| 2,598,179 | 5/1952 | Kelbel | 74/761 |
| 2,873,621 | 2/1959 | Simpson | 74/759 X |
| 2,873,623 | 2/1959 | Simpson | 74/759 |
| 3,031,901 | 5/1962 | Simpson | 74/759 |
| 3,217,563 | 11/1965 | Simpson | 74/759 X |
| 3,319,491 | 5/1967 | Simpson | 74/759 X |

Primary Examiner—Charles J. Myhre
Assistant Examiner—Thomas C. Perry
Attorney—Keith L. Zerschling et al.

[57] ABSTRACT

A simplified planetary gear mechanism for distributing driving torque from a high speed engine to the driveshaft of a wheeled vehicle wherein relatively high torque multiplying ratios are available and wherein clutches and brakes are arranged in strategic disposition with respect to simple planetary gear elements to provide uniformly stepped ratios from the lowest ratio to a high ratio with a simplified engagement and release pattern, the high ratio being substantially greater than unity, and wherein a minimum number of friction torque establishing devices is required.

2 Claims, 2 Drawing Figures

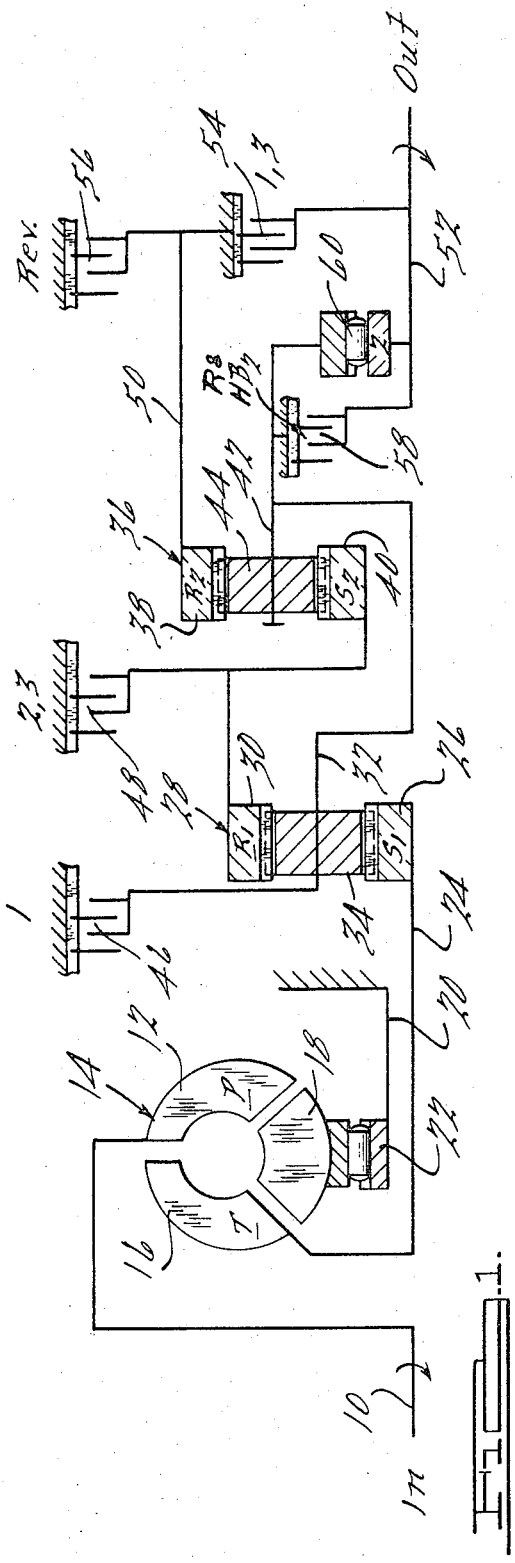

3,730,021

INLINE TRANSMISSION FOR HIGH SPEED ENGINES

GENERAL DESCRIPTION OF THE INVENTION

My invention is adapted to be used in the driveline of a wheeled vehicle having a high speed rotary engine such as a so-called "Wankel" engine or a gas turbine engine. It may be used also in an environment such as that shown in my previously issued U.S. Pat. No. 3,473,413.

Like many prior art planetary transmission arrangements, the improved transmission mechanism of this disclosure includes two simple planetary gear units, the carriers for which are connected together for rotation in unison. The power input shaft for the gearing is connected directly to the sun gear of a first of the planetary gear units in order to increase the relative torque multiplication ratio during initial acceleration from a standing start. With the carrier of the first planetary gear unit acting as a reaction point for the gearing, the ring gear of the first planetary gear unit drives the sun gear of the second planetary gear unit. The torque then is multiplied a second time by the second planetary gear unit as the ring gear is clutched to the power output shaft. To effect a ratio change from this lowest ratio, the clutch for the ring gear of the second planetary gear unit is disengaged and a nonsynchronous overrunning clutch connection then is established between the common carrier for the gearing and the output shaft. At the same time a friction brake for the ring gear of the first planetary gear unit is applied. The same brake remains applied during a ratio change to the high speed ratio. It serves as a reaction point for both the ring gear of the first planetary gear unit and the sun gear of the second planetary gear unit as driving torque from the carrier of the first gear unit is transferred to the second gear unit. The ring gear torque of the second gear unit then is distributed through the previously mentioned selectively engageable clutch that establishes a connection between the ring gear of the second planetary gear unit and the output shaft.

During reverse drive a compound torque transmitting path is established through the two gear units. This is achieved by anchoring the ring gear for the second planetary gear unit and engaging a friction clutch that establishes a driving connection between the common carrier and the output shaft which bypasses the overrunning clutch used during intermediate speed ratio operation in the forward drive range.

The torque multiplication ratio in "high" and the increased ratios in "low" and "intermediate" make it possible to use the mechanism of my invention in a "trans-engine" arrangement without a differential wherein the vehicle axle shafts are driven directly by the transmission output shaft.

BRIEF DESCRIPTION OF THE FIGURES OF THE DRAWING

FIG. 1 shows in schematic form a planetary gear mechanism embodying the improvements of my invention;

FIG. 2 is a performance chart showing the ratios that are available during operation of the mechanism in FIG. 1 in the forward driving range as well as in reverse ratio.

GENERAL DESCRIPTION OF THE INVENTION

Reference character 10 designates generally one end of the torque output shaft of a rotary engine. It is connected through a suitable driveplate to the impeller 12 of a hydrokinetic torque converter 14. The converter 14 includes, in addition to the impeller 12, a bladed turbine 16 and a bladed stator 18. The converter, impeller, turbine and stator are arranged in toroidal fluid flow relationship in the usual way. Stator 18 is anchored against stationary turbine sleeve shaft 20 by overrunning brake 22. During operation in the torque conversion range, brake 22 permits freewheeling motion of the stator 18 in the direction of rotation of the impeller during operation of the converter in the coupling range.

Turbine 16 is connected to engine shaft 24 which is drivably connected to sun gear 26 of a first simple planetary gear unit 28. Gear unit 28 includes, in addition to the sun gear 26, ring gear 30, carrier 32 and planet pinions 34 journalled rotatably on the carrier 32 in meshing engagement with the sun gear 26 and the ring gear 30.

The second planetary gear unit 36 includes ring gear 38, sun gear 40, carrier 42 and planet pinions 44 journalled rotatably on the carrier 42 in meshing engagement with the ring gear 38 and the sun gear 40. Carrier 32 is connected integrally for rotation in unison with the carrier 42.

Carrier 32 is anchored during low speed ratio operation by a friction brake illustrated schematically at 46. Ring gear 30 and sun gear 40 are anchored by common reaction brake 48 during operation of the mechanism in the intermediate speed ratio, as well as in the third speed ratio.

Ring gear 36 is connected to driveshell 50 which surrounds the rearward portion of the mechanism and which is connected directly to the output shaft 52 through selectively engageable friction clutch 54. Clutch 54 is engaged during operation in the first speed ratio and in the third speed ratio. The output shaft 52 in turn may be connected by means of a driveshaft and differential and axle assembly to the vehicle traction wheels.

Ring gear 38 and driveshell 50 are anchored during reverse drive operation by the first friction brake 56.

Carrier 42 is connected to output shaft 52 during reverse drive operation by reverse drive clutch 58. Clutch 58 may be engaged also during hill braking operation in the second speed ratio.

The carrier torque on the common carrier is transferred to the output shaft 52 during operation in the intermediate speed ratio through an overrunning clutch 60. As mentioned earlier, clutch 58 may be used as a hill braking clutch for connecting the output shaft of the common carrier during hill braking operation since the overrunning coupling 60 is incapable of transferring torque through the mechanism in a reverse direction.

The ratios that are available are illustrated in FIG. 2. A typical value for the low speed ratio is 6. It may be computed as indicated by the equation on the left-hand side of the chart of FIG. 2 where R1 indicates the ring gear pitch diameter of gear 30, R2 indicates the pitch diameter of ring gear 38, S1 indicates the pitch diameter of sun gear 26 and S2 indicates the pitch diameter of sun gear 40. Second speed ratio, high speed ratio and reverse speed ratio are indicated also in FIG. 2.

It should be noted that the ratio step between the low ratio and the intermediate ratio is 1.5, e.g., the ratio of the low ratio of the intermediate ratio is equal to 1.5. The corresponding ratio step between the intermediate ratio and the high speed ratio also is 1.5. This consistency in the ratio steps contributes to ratio shift smoothness.

During operation in the low speed ratio, brake 46 and clutch 54 are applied. Turbine torque delivered to the sun gear 26 is multiplied by gear unit 28. The ring gear torque on gear unit 28 is transferred to the sun gear 40 of the gear unit 36 and again is multiplied as the ring gear torque drives the output shaft 52. A ratio change to the intermediate ratio is achieved primarily by disengaging brake 46 and clutch 54 while engaging brake 48. In these circumstances ring gear 30 acts as a reaction member and overrunning clutch 60 now transfers the carrier torque from carrier 32 directly to the output shaft 52.

High speed ratio operation is achieved by reengaging clutch 54 while brake 48 remains applied. The carrier torque on carrier 32 is transferred to carrier 42; and with the sun gear 40 now acting as a reaction point, the ring gear 36 drives the output shaft 52.

During operation in reverse, a compound torque delivery path is established. The output shaft 52 becomes connected to the carrier 32 through the clutch 58. Thus the carrier 32 resists rotation as input torque is delivered to the sun gear 26. The direction of torque acting on the carrier 32 is in a forward driving direction. The ring gear torque on ring gear 38, however, is in a reverse direction. This torque is multiplied by the gear unit 36 and delivered to the carrier 42 in a reverse driving direction. The net torque delivered to output shaft 52 through the engaged clutch 58 then is in a reverse driving direction. A typical value is minus 5, as indicated in the chart of FIG. 2. This value for the reverse ratio is sufficiently high to allow sufficient reverse drive performance.

Having thus disclosed a preferred embodiment of my invention, what I claim and desire to secure by U.S. Letters Patent is:

1. A planetary gear system for use in a vehicle driveline for delivering driving torque from a driving shaft to a driven shaft, a pair of simple planetary gear units, each gear unit comprising a ring gear, a sun gear, a carrier and planet gears journalled on the carrier in meshing engagement with the sun and ring gears, the ring gear of the first of said gear units being connected drivably to the sun gear of a second of said gear units, the carriers of said gear units being connected together for rotation in unison, first clutch means for connecting the ring gear of said second gear unit to said driven member, second clutch means connecting said carriers to said output shaft during reverse drive operation, third clutch means for connecting said carriers to said driven member during operation in an intermediate ratio, first brake means for anchoring the carrier of said first gear unit during operation in a first speed ratio, second brake means for anchoring the ring gear of said first gear unit and the sun gear of said second gear unit during operation in intermediate and third speed ratios and a reverse brake means for anchoring the ring gear of said second gear unit during reverse drive.

2. The combination as set forth in claim 1 wherein said third clutch means comprises an overrunning coupling having a pair of races with overrunning clutch elements located between the races, one race being connected to the carriers and the other race being connected to said driven member whereby a driving connection is established between said carrier and said driven member during intermediate forward drive operation, said second clutch means being adapted to bypass said overrunning coupling whereby torque can be transferred from said carriers to said driven member in either direction.

* * * * *